Patented Jan. 10, 1950

2,494,114

UNITED STATES PATENT OFFICE 2,494,114

STABILIZATION OF FATTY MATERIALS

Howard C. Black, Chicago, Ill., assignor to Swift & Company, Chicago, Ill., a corporation of Illinois No Drawing. Application July 20, 1945, Serial No. 606,269

3 Claims. (Cl. 260—398.5)

The present invention relates to the stabilization of fatty materials including fats, fatty oils, fatty acids, fatty acid salts and the like and more particularly to their stabilization against rancidity produced by oxidation.

Fatty materials are notably subject to rancidity and exhibit the accompanying factors of developing disagreeable odors and tastes. This rancity is due in a large measure to an oxidation reaction and there have been numerous attempts in the past to control or materially retard this reaction by the addition of various substances to the fatty materials.

In this connection, the substance nor dihydro guaiaretic acid (hereinafter referred to as "NDGA") has already been proposed for use as a stabilizing agent for fats and fatty materials.

However, while this material has been noted to have a pronounced stabilizing effect on the materials treated it does not alone protect fatty materials from rancidity to the extent which is necessary in all instances of commercial use in which long periods of storage are often required.

It is accordingly an object of the present invention to provide a process by means of which a fatty material may be stabilized against the development of rancidity even though stored for long periods of time.

It is another object of the invention to provide a product, the fatty content of which is stabilized against the development of rancidity for long periods of time.

Another object of the invention is to provide a process by means of which a fat or oil adapted to be used for food purposes may be stabilized against rancidity for long periods of time without the addition of substances which will detrimentally affect their odor or taste in connection with the purpose for which they are used.

Another and further object of the present invention is to provide a product containing fats or fatty materials suitable for use as a food or in the preparation thereof, which is stabilized against rancidity by means of a composition producing no objectionable odor or taste.

A still further object of the present invention is to provide a process for the preparation of an animal or a vegetable shortening which is stabilized for long periods of time against the development of objectionable odor or taste by its becoming rancid.

Yet another object of the invention is to provide an animal or vegetable shortening which is stabilized against becoming rancid even though maintained in an open container for considerable periods of time.

Other and further objects of the present invention will be apparent from the following detailed description.

It has been found that the addition of citric acid, in combination with small amounts of lecithin, produces a pronounced synergistic effect with regard to the stabilization against rancidity of fats and fatty materials containing "NDGA." The addition of small amounts of "NDGA" and citric acid to a fatty material acts very effectively to retard the oxidation reactions which lead to the development of rancidity. The further addition of small amounts of lecithin produces a still more pronounced retarding of detrimental oxidation reactions as evidenced particularly by the postponement of reversion of the fat. Reversion is the state of deterioration at which off odors and tastes first become apparent. Amounts of citric acid in the range of .001% to .005% and amounts of commercial lecithin combined therewith in the amounts of .01% to .05% have proven their effectiveness in exerting a stabilizing effect on the fatty material. The percentage of "NDGA" used is preferably within the range of .01% to .05%.

The following example is included as illustrative of the invention but is of course not intended to limit it in any way.

| Material Tested | Reverted—Time in days | Rancid—Time in days |
|---|---|---|
| Control (Mixed animal-vegetable shortening) | 7 | 12 |
| Control+.02% "NDGA" | 10 | 14 |
| Control+.002% citric acid | 12 | 24 |
| Control+.03% lecithin | 9 | 20 |
| Control+.02% "NDGA"+.002% citric acid | 16 | 80 |
| Control+.02% "NDGA"+.03% lecithin | 12 | 40 |
| Control+.02% "NDGA"+.002% citric acid+.03% lecithin | 22 | 80 |

The following table prepared in connection with the above example, demonstrates conclusively that the citric acid and lecithin exert a pronounced synergistic effect and that the result accomplished is not the mere result of the additive effect of the various ingredients of the stabilizing composition exerting their individual capacities as anti-oxidants. Thus, .02% "NDGA" alone protects a fat against reversion for three days over and above the control sample (compare items 1 and 2 in the table above). Also, .002% citric acid alone protects a fat against reversion for five days over and above the control sample (compare items 1 and 3 in table above). The foreseeable or predictable effect which one would expect to get upon using these two stabilizing ingredients together in a fat in these same proportions would be to stabilize the fat for not more than (3+5) 8 days (see item 1 in table below). The foreseeable or additive effect for the other several combinations of stabilizers can be similarly derived as to reversion and rancidity from the table above. These have all been compiled from this table as indicated above and are tabulated below as "Predicted result." The actual results obtained, however, are somewhat different and prove that more than an additive effect is produced by the combination, e. g., the additive result expected from using "NDGA" and citric acid to protect a fat against reversion should be no greater than 8; yet, referring to the results shown in the table above and from a comparison of items 1 and 5, it is seen that this combination of stabilizing components protected the fat against reversion for nine days after the control sample reverted. This fact is tabulated below under "Actual result." A comparison of the best possible additive effect or predictable result as shown in the table below makes it abundantly clear that a synergistic and unpredictable cooperation takes place when the specified stabilizers are used to supplement each other.

| | Predicted Result Based on Additive Effect | Actual Result |
|---|---|---|
| Reverted Test: | | |
| "NDGA"+citric acid | 8 | 9 |
| "NDGA"+citric acid+lecithin | 10 | 15 |
| Rancidity Test: | | |
| "NDGA"+citric acid | 14 | 68 |
| "NDGA"+citric acid+lecithin | 22 | 68 |

In the above example the lecithin used was the commercial product known as soya bean lecithin but it is to be understood that other commercial phosphatides such as those found in corn oil are suitable. Both of these commercial phosphatides are mixtures of lecithin and cephalin dispersed in a protective carrier vegetable oil. The amount of commercial oil usually ranging between 30% and 40% of the product. The actual amount of phosphatides exclusive of carrier oil usable in the present invention will therefore range between .0035% and .018%.

Having described my invention I claim:

1. A method for stabilizing fatty materials against reversion and rancidity produced by oxidation comprising adding thereto a mixture of a small amount of nor dihydro guaiaretic acid, together with a small amount of citric acid and a small amount of lecithin.

2. A method for stabilizing fatty materials against reversion and rancidity produced by oxidation comprising adding thereto a mixture of nor dihydro guaiaretic acid in the proportion of from .01% to .05%, together with citric acid in the proportion of from .001% to .005%, and lecithin in the proportion of from .01% to .05%.

3. A composition of fatty material stabilized against reversion and rancidly comprising a body of refined fatty material, having incorporated therein about .01% to .05% of nor dihydro guaiaretic acid, about .001% to .005% citric acid, and about .01% to .05% lecithin.

HOWARD C. BLACK.

REFERENCES CITED

The following references are of record in the file of this patent:

Riemenschneider et al.: Oil and Soap, Oct. 1944, pp. 307–309.

Mattil et al.: Oil and Soap, June 1944, pp. 160–161.

Olcott et al.: J. Am. Chem., Nov. 1936, pp. 2204–2208.